United States Patent [19]

Cornish et al.

[11] 4,197,589

[45] Apr. 8, 1980

[54] OPERATION SEQUENCING MECHANISM

[75] Inventors: Merrill A. Cornish, Austin; David M. Chastain, Plano; John C. Jensen, Austin, all of Tex.

[73] Assignee: Texas Instruments Incorporated, Dallas, Tex.

[21] Appl. No.: 857,630

[22] Filed: Dec. 5, 1977

[51] Int. Cl.² ............................................. G06F 9/18
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,229,260 | 1/1966 | Falkoff | 364/200 |
| 3,293,616 | 10/1966 | Mullery et al. | 364/200 |
| 3,470,540 | 9/1969 | Levy | 364/200 |
| 3,573,854 | 4/1971 | Watson et al. | 364/200 |
| 3,611,306 | 10/1971 | Reigel et al. | 364/200 |
| 3,728,686 | 4/1973 | Weisbecker | 364/200 |
| 3,781,814 | 12/1973 | Deerfield | 364/200 |
| 3,962,706 | 6/1976 | Dennis et al. | 364/900 |
| 3,978,452 | 8/1976 | Barton et al. | 364/200 |
| 4,047,161 | 9/1977 | Davis | 364/200 |

*Primary Examiner*—Gareth D. Shaw
*Assistant Examiner*—E. Chan
*Attorney, Agent, or Firm*—Melvin Sharp; Leo N. Heiting; Thomas G. Devine

[57] ABSTRACT

A mechanism, including a memory, sequences operation in a controlled processor. Each operation is stored in memory together with a portion indicating the current state of predecessor operations required to be completed before execution of the current operation. Also associated with the current operation is provision for at least one address of a successor operation. A predecessor portion is updated as the predecessor operations are performed and at a predetermined state, the current operation is sent to the controlled processor for processing. Following the processing, the operations at the successor addresses have their predecessor portions updated. Thus, the order in which the operations are performed is totally independent of an arbitrary sequencing and instead is dependent only upon availability.

22 Claims, 6 Drawing Figures

OPERATION SEQUENCING MECHANISM

BACKGROUND OF THE INVENTION

1. Field of the Invention

This invention relates to operation sequencing mechanisms. More particularly, it relates to data flow or distributed data processors.

2. Description of the Prior Art

The requirement for speed and efficiency of digital computing has increased over the years, and so has the complexity of digital computers increased. Switching speed has been increased to the point where incremental changes in such speeds does not provide the desired increases in the overall computing speed.

To substantially reduce the overall computing time, processors involving multiple operational or functional units have been designed. The functional units are intended to operate in parallel to thereby reduce the computing time. Such systems have been very successful but have suffered from extreme complexity and high cost.

Another prior art design that has greatly reduced overall computing time is that of the so-called pipeline computer where the computer is extremely fast in performing vector computations. However, highly sophisticated software is required to take advantage of the speed of these pipeline computers and in fact, there are certain classes of problems that are not efficiently run on such computers.

A relatively recent step forward in increasing speed of operation is that described in U.S. Pat. No. 3,962,706. The special purpose computer of that patent has an active memory that contains instructions and operands in so-called cells or instruction packets. No instruction is executed until its corresponding operands have been provided within its cell. A cell is made up of an instruction (specifies a functional unit and a specialized capability of that unit) and two operand registers. When the operands have been provided, the packet is sent to an arbitration unit and from there to the specified functional unit. From the functional unit, the resultant packet is sent to a distribution unit and back to the active memory. This type of specialized computer lends itself extremely well to small scale computers for doing specialized tasks such as fast Fourier transforms. Its distributed control, within the active memory, the arbitration unit, the distribution unit, etc., however, does not permit full scale implementation. A weather model, for example, which utilizes a million or more instructions is not feasibly capable of being implemented using this technique.

Another recent innovation is described in U.S. Pat. No. 3,978,452. The novelty described is in a plurality of function modules, each having its own arithmetic logic and memory. A module will not operate until all required inputs have been received by the module. It is a sophisticated technique, but requires a great deal of hardware. To reduce the hardware requirement, serial transmission and arithmetic is employed.

To overcome these disadvantages, the invention set out herein utilizes central control and a passive memory which can be extremely large. Also, the sequencing mechanism of this invention is adopted for use with a general purpose computer and is readily assembled from available integrated circuits.

BRIEF SUMMARY OF THE INVENTION

An operation sequencing mechanism is structured to perform parallel operations, each operation depending upon the completion of predecessor operations and not upon a sequencing instruction register. The sequencer has a random access memory for storing the operations to be performed. A digital operation packet in the memory is divided into a successor address portion having provision for at least one address, a specification portion for storing at least one specification of an operation to be performed, a predecessor state portion for storing an updated state of predecessor operations required to be completed before the current operation can be performed, and a restore state portion for storing the original state of the predecessor state portion. The operation packet can be of variable length. The variable length feature permits greater flexibility in handling double precision arithmetic, multiple additions, etc. An operational unit, typically including a data memory, receives the specification from the random access memory and performs the operation. Such operation is performed only when all of the predecessor operations have been performed. This can be determined, for example, by setting the number of predecessor operations to be performed in the predecessor state portion and then decrementing such portion until it is equal to zero. Then the operation associated with such a decremented portion is ready for execution. It may well be that more than one operation at any one time is ready for execution and all such operations are sent into an operation address list.

After an operation has been completed, the associated successor addresses are read out of a successor address list and their predecessor state portions are updated. In a preferred embodiment, the predecessor state portion is a count of the predecessor operations. This count is updated by decrementing until a zero is reached, indicating that all predecessor operations have been completed and that the current operation may now be performed. If, during the update, a zero is reached, then the operation at the successor address is ready for execution and is sent into the operation address list. Also, when the predecessor state portion reaches zero, the original predecessor state portion indication, which is retained in the restore state portion, is then written into the predecessor state portion so that the operation is again available. Associated with each of the successor addresses is an indicator, which permits skipping the updating of the packet at such address if an inactive status is indicated.

DETAILED DESCRIPTION OF THE INVENTION

Figure 1:
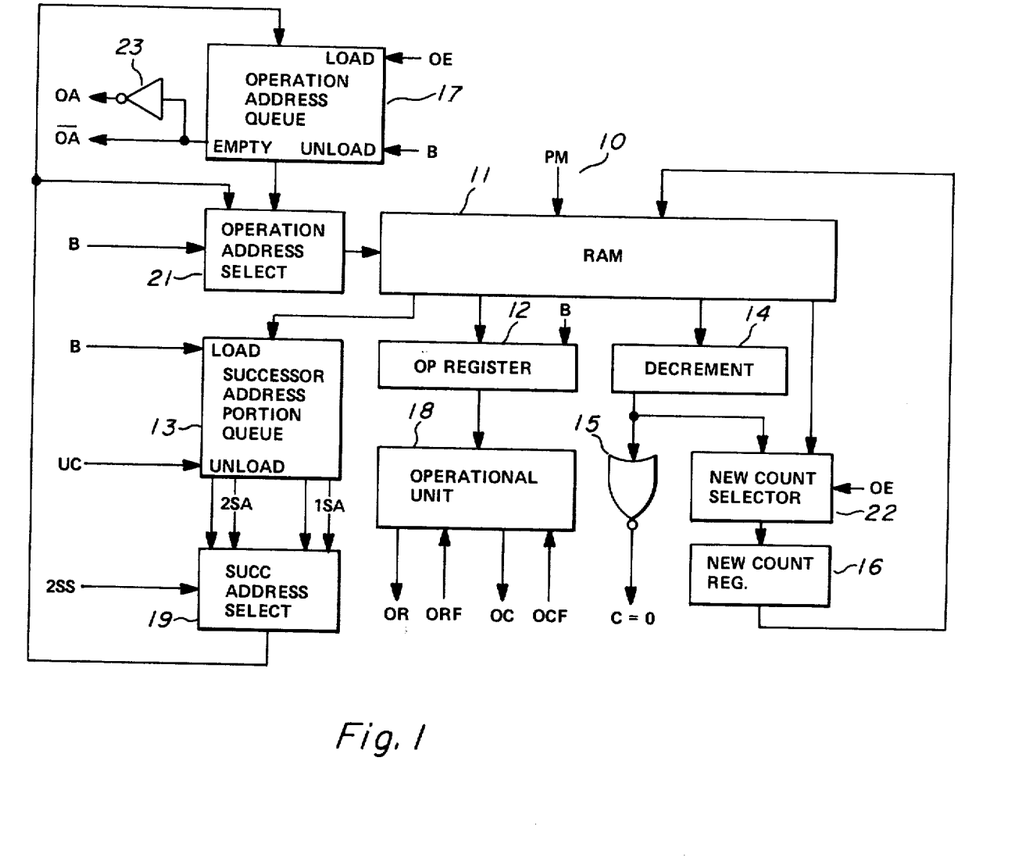
FIG. 1 is a block diagram illustrating the interconnection between the components of this invention.

FIG. 1 shows the processor 10 in block form. All of the components shown in FIG. 1 are readily available from, for example, Texas Instruments Incorporated, Dallas, Texas, the assignee of this invention.

The memory 11 is a Texas Instruments Type SN74S209 random-access read/write memory described in Texas Instruments Incorporated "The Semiconductor Memory Data Book for Design Engineers" beginning at Page 172. The output of random access memory (RAM) 11 goes to successor address list queue 13, operational register 12 and decrementer 14. Successor address portion queue 13 is a Texas Instruments Type SN74S225 16×5 asynchronous first-in-first-out memory described in Texas Instruments "Bipolar Microcomputer Components Data Book for Design Engineers" dated January 1977 beginning at Page 39, Section 4. Operational register 12 is a Texas Instruments Type SN74173 Register and decrementer 14 is a Texas Instruments SN7483A Adder, both described in the Texas Instruments Incorporated "The TTL Data Book for Design Engineers," copyrighted 1973, beginning on Page 360 and Page 198, respectively. The output of successor address portion queue 13 is connected to the input of successor address select 19 and the output of RAM 11 together with the output of decrementer 14 is connected to the input of new count selector 22. Successor address select 19 and new count selector 22 are both Texas Instruments Type SN74157 Quadruple 2-line-to-1-line Data Selectors/Multiplexers described in Texas Instruments Incorporated "New TTL MSI for Design Engineers" beginning at Page 34. The output of successor address select 19 is connected to the input of operation address queue 17 made up of the above-mentioned SN74S225 device. The output of successor address select 19 is also an input to operation address select 21 which has another input from the output of operation address queue 17. Operation address select 21 is made up of type SN74157 devices mentioned above. The output of decrementer 14 is also connected to NOR circuit 15 which provides an indication that decrementer 14 has reached a zero count. The output of new count selector 22 serves as an input to new count register 16 which is made up of the Type SN74173 devices and has an output connected to the input of RAM 11. he operational unit 18 is shown with its input connected to the output of operation register 12. The operational unit of this preferred embodiment is comprised of a Texas Instruments Type SN74S481 Microprocessor and a Texas Instruments Type SN74S482 Control Element described in Texas Instruments Incorporated "Bipolar Microcomputer Components Data Book" dated January 1977" starting at Page 1 of Section 1 and Page 41 of Section 5, respectively. Appropriate read-only memories such as Texas Instruments Type SN74S288, described in Texas Instruments Incorporated "The Semiconductor Memory Data Book" beginning at Page 182 of Section 4 may be used in conjunction with the SN74S481 and SN74S482. The makeup of the operational unit 18 is not important to this invention per se, and sequencing of, for example, numerically controlled machine tools is contemplated. Furthermore, while a single operational unit is shown, it is contemplated that a plurality of functional units, identical or different, may be contained therein and/or operational units may be added. A system utilizing a plurality of processing elements (functional units) is set out in U.S. Pat. No. Re. 26,171. In this embodiment, the operational unit 18 must provide a signal "operation request" (OR) and "operation complete" (OC).

A system clock (not shown) is provided. In this preferred embodiment, a Texas Instruments Type SN74LS124 dual voltage-controlled oscillator, described in Texas Instruments Incorporated "Supplement to the TTL Data Book for Design Engineers," First Edition, beginning at Page S-62, is used. Of course, the sequencer may be designed to operate totally or partially asynchronously.

Figure 2:
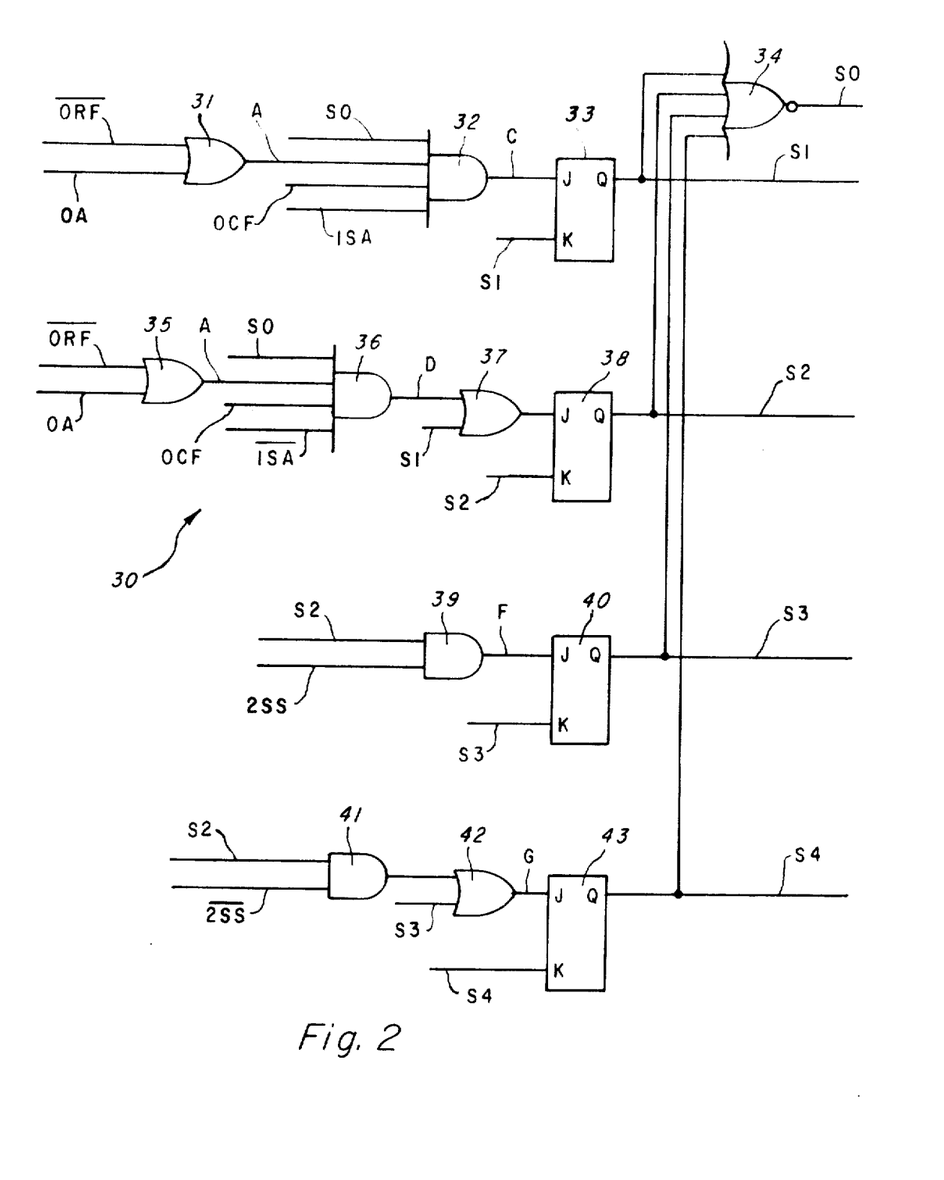
FIG. 2 illustrates the sequencing logic.

Referring now to FIG. 2, sequencing logic 30 is illustrated. The result of this logic is to provide state signals S0-S4. A state transition requires the use of sequential pulses from the clock.

OR circuits 31 and 35 are identical and receive identical inputs. One, $\overline{ORF}$, is received from inverter 58 of FIG. 3 and the other, OA, is received from an output of inverter 23 of FIG. 1. The signal A from OR circuit 31 is ANDED by AND circuit 32 with the S0 signal, the operation complete flag (OCF) signal from flip flop 59 of FIG. 3 and the first successor active (1SA) signal from successor address portion queue 13 of FIG. 1. AND circuit 32 provides output signal C which in turn serves as the set input of flip flop 33 whose Q output is signal S1 and which serves as an input to NOR circuit 34.

The output signal A from OR circuit 35 is ANDED by AND circuit 36 with signal S0, signal OCF and the signal indicating that the first successor is not active ($\overline{1SA}$). AND circuit 36 has an output signal D which, together with signal S1, serve as the inputs to OR circuit 37 whose output is a set input to flip flop 38 whose Q output is signal S2 and which also serve as another input to NOR circuit 34.

Figure 3:
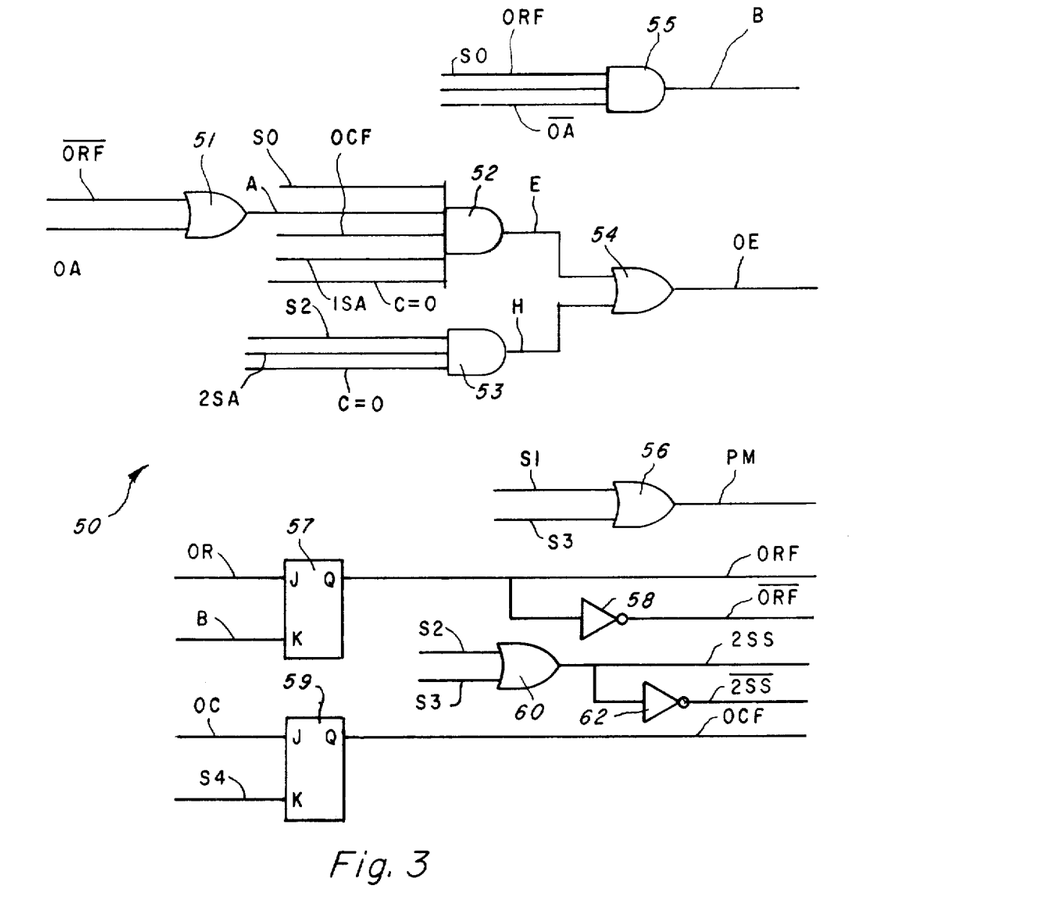
FIG. 3 shows the gating logic.

Signal S2 and signal "second successor select" (2SS), the output from OR circuit 60 of FIG. 3, are the inputs to AND circuit 39 whose output signal F is the set input to flip flop 40 whose Q output is signal S3 and which serves as a third input to NOR circuit 34.

AND circuit 41 has input signals S2 and $\overline{2SS}$ from inverter 62 of FIG. 3. The output of AND circuit 41, together with signal S3 are the inputs to OR circuit 42 whose output signal G is the set input to flip flop 43 whose Q output is signal S4 and which is another input to NOR circuit 34. The output of NOR circuit 34 is signal S0. The reset input to flip flops 33, 38, 40 and 43 are provided by signals S1, S2, S3 and S4, respectively.

The gating logic 50 of FIG. 3 provides the following gating signals:
Operation Fetch Gate (B);
Operation Enable Gate (OE);
Predecessor Memory Write Gate (PM);
Operation Request Flag (ORF); ($\overline{ORF}$);
Second Successor Selected (2SS); ($\overline{2SS}$);
Operation Complete Flag (OCF);
Update Complete Gate (S4 or UC).

Signal B, the operational fetch signal is developed by ANDING, through AND circuit 55, signals S0, ORF and OA.

Signal A is again shown as the output of OR circuit 51 which is identical to OR circuits 31 and 35 of FIG. 2, and which in fact could all be combined into one OR circuit. Signal A is ANDED, in AND circuit 52, with signal S0, OCF, 1SA, and C=0 (the output of NOR circuit 15 from FIG. 1). Output signal E from AND circuit 52 is connected to one input of OR circuit 54.

AND circuit 53 has three input signals, S2, 2SA (second successor active from Successor Address Portion Queue 13 in FIG. 1) and C=0. Output H of AND circuit 53 is a second input to OR circuit 54 whose output is signal OE.

Signals S1 and S3 are the inputs to OR circuit 56 whose output is signal PM.

Signal OR from operational unit 18 in FIG. 1 is the set input for flip flop 57, while signal B is the reset input. The output signal from flip flop 57 is signal ORF. Signal ORF is also inverted through inverter 58 to form signal $\overline{ORF}$.

Signals S2 and S3 are the inputs to OR circuit 60 whose output is signal 2SS, also inverted through inverter 62 to form signal $\overline{2SS}$.

Signal OC from operational unit 18 in FIG. 1 serves as a set input to flip flop 59 while signal S4 is the reset input. The output of flip flop 59 is signal OCF.

Figure 4:
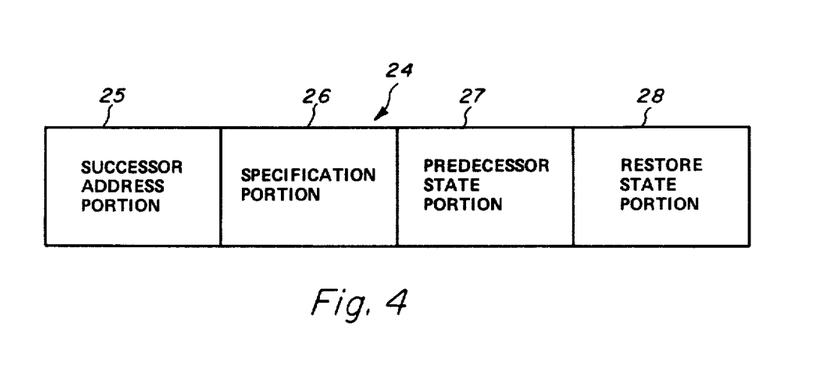
FIG. 4 illustrates the makeup of a digital operation packet in the instruction memory.

FIG. 4 shows a typical digital operation packet 24 from the operation memory (or operation portion) having a successor address portion 25 with provision for storing at least one successor address, a specification portion 26 for storing at least one operation to be performed, a predecessor state portion 27 for storing the state of the predecessor instructions to be completed before the operation in specification portion 26 of the current instruction can be executed, and restore state portion 28 whose contents are used when the predecessor state portion has been counted to zero to restore the predecessor state portion to its original value. It should be noted that the predecessor state portion could actually be indicative of a state with an update of the state ultimately resulting in a comparison of another predetermined state to cause the instruction to be sent to the operational unit. Likewise, the restore state portion 28 can be a restore state portion with the original state held to later be written into the predecessor state portion 27.

MODE OF OPERATION

Figure 5A:
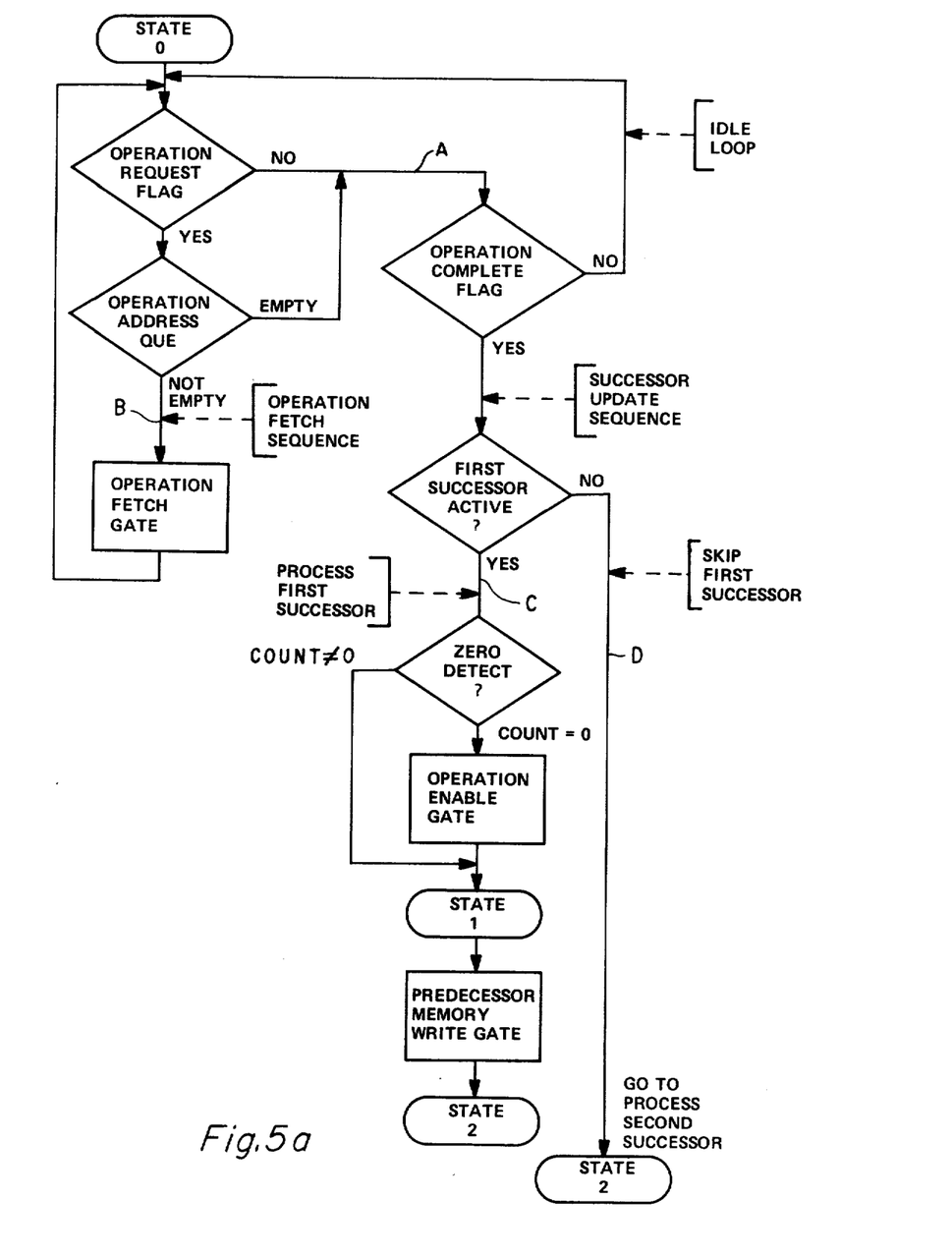
FIGS. 5a and 5b make up a flowchart to illustrate the operation of the invention.
Figure 5B:
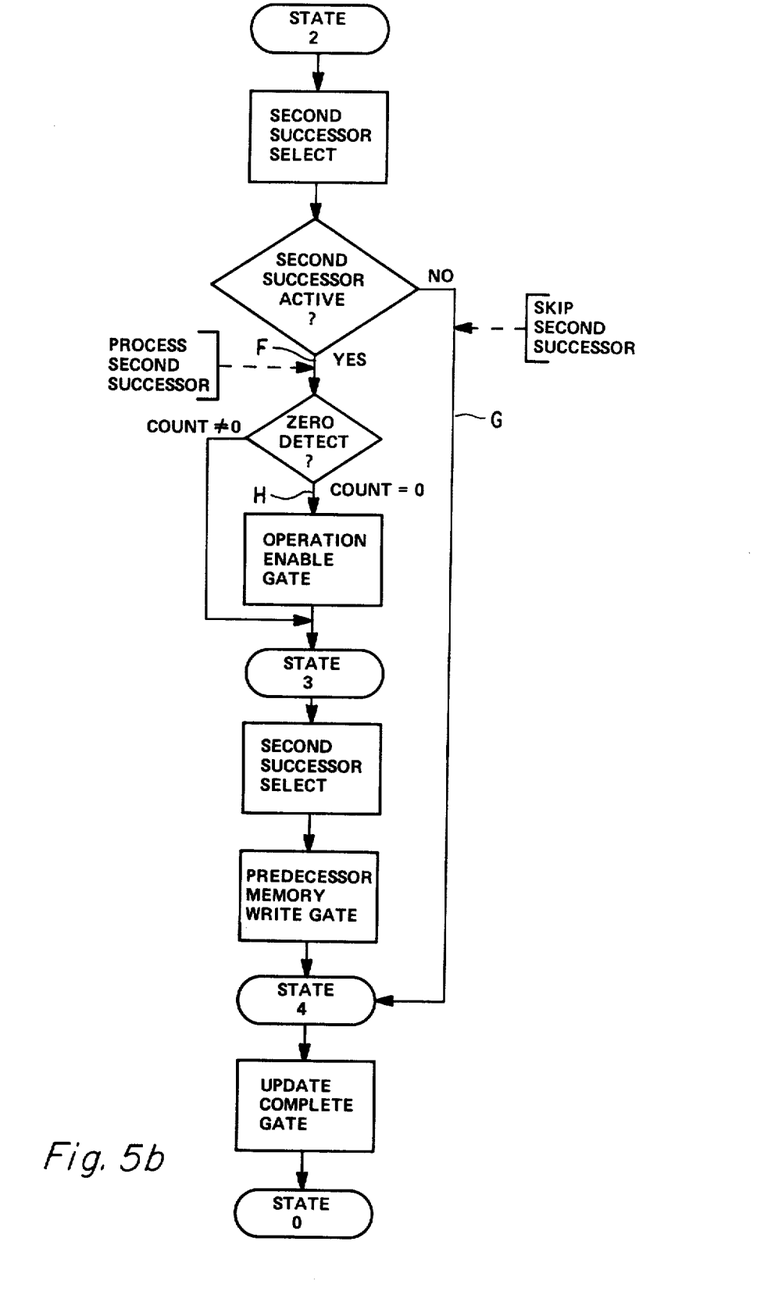

To understand the operation of the processor of this invention, reference should be made to all of the figures, but particularly to FIGS. 5a and 5b which, in flow diagram form, illustrate the total operation. The signals designated A through H in FIG. 5 correspond to the signals of the same designation shown in FIGS. 2 and 3.

The processor is said to be in an idle loop when in state 0 as shown in FIG. 5a. Signal A high results from "no operation request flag" or an "empty operation address queue." This corresponds to the OR circuits 31, 35 and 51 of FIGS. 2 and 3. If the operation address queue is not empty and there is an "operation request flag," then the operation fetch sequence begins as indicated. At this point, it must be assumed that there is a digital operation packet in the operation address queue 17 of FIG. 1 so that signal B high causes it to transfer into the operation address selector 21 which in turn causes the contents of the specification portion (FIG. 4) to be transmitted to operation register 12. Operation register 12 is gated also by signal B which sends the specification into the operational unit 18 for processing. When the processing is completed, the path proceeds back to state 0 and through "no operation request flag." There is an "operation complete flag" at that point and therefore the successor update sequence is begun. Typically, one bit of the successor address indicates whether the successor is active, that is, whether it should be updated. The successor addresses are ordinarily active and are designated as inactive for special purposes such as having two of them in a row to stop the program. In this case, assume that the first successor is active which then provides signal C high which is the output of AND gate 32 in FIG. 2. Then the first successor should be processed. The processing is accomplished by sending the address from successor address select 19 to the operation address select 21. The digital operation packet at that address is then read out of the RAM 11 for updating. The contents of the predecessor state portion 27 are read into the decrementer 14, the contents of which in turn are read into the new count selector 22 along with the restore state portion.

Assume that $C \neq 0$. Then signal S1 is high (from flip flop 33 in FIG. 2). The next step is to provide a predecessor memory write gate (signal PM from OR circuit 56 of FIG. 3) which is an input to RAM 11 for writing in the decremented count from decrementer 14 when operation enable gate (OE) signal is low. The OE signal low is applied to new count selector 22 which provides the decremented count to the new count register 16, the contents of which are gated to be written into the RAM 11 in the predecessor state portion 27.

Returning to signal C, if the zero detect resulted in $C=0$, then the operation enable gate (OE) signal from OR circuit 54 in FIG. 3 goes high, indicating that the operation at the first successor address is ready to be executed. The first successor address is then sent to the operation address queue 17 as a "fired" instruction taking its place in the queue. Also, signal OE gates the contents of the restore count field 28 out of new count selector 22 into new count register 16. The contents are then written as described above in the predecessor count field 27 to restore it to its original value. If the first successor had not been active, then signal D, the output of AND circuit 36 in FIG. 2, would have been high, and the first successor address would have been skipped, taking the operation directly to state 2 (S2).

In FIG. 5b, the process goes from state 2 and provides the second successor select (2SS) signal high which is seen in FIG. 3 as a signal that is present out of OR circuit 60 when either state 2 (S2) or state 3 (S3) is high. If the second successor is active, the process continues to provide signal F high for processing the second successor. As in the case of the first successor, the address of the second successor is gated out of the successor address select 19 and into the operation address select 21 to read out the operation packet from the RAM 11 at the address of the second successor. The contents of the predecessor state portion enter the decrementer 14 and the decremented number enters the new count selector 22. In FIG. 5b, if the count is not zero, the procedure goes on to state 3 with the second successor select (2SS) signal again being high with a predecessor memory write gate (PM) being high out of OR circuit 56. If the operation enable gate is low, the decremented number from decrementer 14 is moved out of the new count selector 22 into the new count register 16 and then by way of signal PM high is written into RAM 11 at the address of the second successor in the predecessor state portion. If the count equals zero, then signal H, from AND gate 53, is high which, through OR circuit 54, provides the operation enable gate (OE) signal high. The operation enable gate enables the entry of the second successor address from successor address select 19 into the operation address queue 17 to take its place as a "fired" instruction for processing. The signal OE also gates out of new count selector 22 the contents of the restore state portion 28 instead of the decremented number from decrementer 14. The restore state portion contents are transferred to new count register 16 and then written into the predecessor state portion 27 of the digital operation packet 24 at the address of the second successor.

If the second successor had not been active, then signal G would have been high out of OR circuit 41 in FIG. 2 and the process would have gone directly to develop state 4 (S4) signal high. The S4 signal is the update complete gate (UC) which unloads and discards the successor addresses in successor address portion queue 13 and also takes the operation back to state zero.

It should be pointed out that the successor address portion queue 13 holds the successor addresses which are companions to the operation held in the operation register. In the case of multiple functional units within the operational unit, or multiple operational units, the queue 13 must be capable of holding the successor address portions of all outstanding operations which have been requested but not completed. The length of the queue 13 must be equal to the largest number of operations that the operational unit or units may ever be processing in parallel plus one entry for the operation held in operation register 12.

It should further be noted that the operation address queue 17 in this preferred embodiment is a first-in first-out type of queue. It may be that instead of a first-in first-out system, a priority system is desired. This might be desirable for a number of reasons. In any event, having the operation addresses stored in one location makes the job of selection on a priority basis extremely simple and such a system is contemplated herein. The operation address list may be connected, for example, to the "operation complete" outputs of a plurality of operational units to provide a first indicia signal so that if an operation requires the use of a particular unit and that unit becomes available, the operation may be performed on the demanding packet even though its address is not up for action. In a similar manner, the successor address portion may be connected to the outputs of a plurality of operational units to provide a second indicia signal to call up selected successor addresses associated with the completed operation.

While this preferred embodiment uses a first-in, first-out memory for the successor address portion and the operation address portion list, it should be understood that such lists can also be formed and handled within the main memory. The operation register 12 may be designed to hold a plurality of specifications, perhaps a block of eight. Such a use is contemplated. Also, although the preferred embodiment illustrates the use of two successor addresses in each operation packet, it is obviously contemplated to use only one, or to use any number more than two.

Even though the preferred embodiment of the invention has been disclosed herein, there may be suggested to those skilled in the art certain minor modifications which do not depart from the spirit and scope of the invention.

What is claimed is:

1. An operation sequencer comprising:
   (a) memory means for reading, writing and storing digital information, including digital operation packets divided into a successor address portion having at least one address, a specification portion for storing the specification of an operation to be performed, a predecessor state portion for storing the current performance state of predecessor operations required to be performed before the current operation can be performed, and a restore state portion for storing the original state of the predecessor state portion,
   (b) operational means having at least one operational unit, connected to the memory means for receiving at least one specification portion of at least one digital operation packet, and for performing the operation;
   (c) update and restore means, connected to the memory means, for receiving and updating the predecessor state portion until at least one predetermined state is reached, and for receiving the restore portion and for writing into the predecessor state portion the digital state in the restore state portion when the predetermined state is reached;
   (d) operation address means for receiving the addresses of operations to be performed and for causing the digital operation packet located in the memory means at the address of a selected one of the addresses of operations to be read out and transferred to the operational means;
   (e) successor address means, for receiving the address from the successor address portion of the digital operation packet and for causing the predecessor state portion and the restore state portion at the successor address to be read out and for the update and restore means to operate, and if the predetermined state is reached, to again transmit the successor address to the operation address means as an operation to be performed; and
   (f) control means, operatively connected to the memory means, the operational means, the update and restore means, the operation address means and the successor address means, for providing gating and sequencing of the sequencer.

2. The sequencer of claim 1 wherein the operational means further comprises an operational register connected to the memory means and to the operational unit.

3. The sequencer of claim 1 wherein the predecessor state portion represents the current state which is the current count of the predecessor operations, the restore state portion is identical to the original predecessor state portion, and wherein the update and restore means further comprises:
   (c) (i) a decrementer connected to receive the contents of the predecessor state portion and to decrement the contents a predetermined amount; and
   (ii) a comparator connected to the decrementer for determining when the contents of the decrementer reach a predetermined count.

4. The sequencer of claim 3 wherein the update and restore means further comprises:
   (c) (iii) a new count selector connected to receive the contents of the decrementer and the contents of the restore state portion and to provide as an output the decremented number when the predetermined count has not been reached and to provide as an output the restore state portion count when the predetermined count has been reached;
   (iv) a new count register, connected to the new count selector for receiving the contents of the new count selector and for writing the contents in the predecessor state portion.

5. The sequencer of claim 1 wherein the operation address means further comprises:
   (d) (i) an operation address queue for receiving and transmitting operation addresses on a first-in, first-out basis.

6. The sequencer of claim 5 wherein the operation address means further comprises:
   (d) (ii) an operation address select connected to and receptive to addresses received from the operation address queue, or connected to and receptive to addresses from the successor address means.

7. The sequencer of claim 1 wherein the operational means includes means for providing a first indicia signal when the operational unit has completed an operation, and wherein the operation address means further comprises:
(d) (iii) an operation address list for receiving operation packet addresses, receptive to the first indicia signal for selecting an address when the first indicia signal is received.

8. The sequencer of claim 7 wherein the operation address means further comprises:
(d) (ii) an operation address select connected to and receptive to selected addresses received from the operation address list and connected to and receptive to addresses from the successor address means.

9. The sequencer of claim 1 wherein the successor address means further comprises:
(e) (i) a successor address queue for receiving successor addresses from the memory means on a first-in, first-out basis.

10. The sequencer of claim 9 wherein the successor address means further comprises:
(e) (ii) a successor address selector, connected to selectively receive successor addresses from the successor address queue and connected to transmit the selected successor address to the operation address means.

11. The sequencer of claim 1 wherein the operational means includes means for providing a second indicia signal for selecting desired successor addresses when the operational unit has completed an operation, and wherein the successor address means further comprises:
(e) (iii) a successor address list for receiving successor addresses from the memory means, receptive to the second indicia signal for transmitting the selected successor address to the operation address means.

12. The sequencer of claim 1 wherein the control means further comprises:
(f) (i) sequencing logic providing event-dependent sequential state signals for sequencing the procedures of the processor through sequential states; and
(ii) a gating logic array, having inputs including the state signals, for providing gating signals to the processor when appropriate state signals are present.

13. The sequencer of claim 2 wherein the predecessor state portion represents the current state which is the current count of the predecessor operations, the restore state portion is identical to the original predecessor state portion, and wherein the update and restore means further comprises:
(c) (i) a decrementer connected to receive the contents of the predecessor state portion and to decrement the contents a predetermined amount; and
(ii) a comparator connected to the decrementer for determining when the contents of the decrementer reach a predetermined number.

14. The sequencer of claim 13 wherein the update and restore means further comprises:
(c) (iii) a new count selector connected to receive the contents of the decrementer and the contents of the restore state portion and to provide as an output the decremented number when the predetermined count has not been reached and to provide as an output the restore state portion count when the predetermined count has been reached;
(iv) a new count register, connected to the new count selector for receiving the contents of the new count selector and for writing the contents in the predecessor state portion.

15. The sequencer of claim 13 wherein the operation address means further comprises:
(d) (i) an operation address queue for receiving and transmitting operation addresses on a first-in, first-out basis.

16. The sequencer of claim 15 wherein the operation address means further comprises:
(d) (ii) an operation address select connected to and receptive to addresses received from the operation address queue, and connected to and receptive to addresses from the successor address means.

17. The sequencer of claim 13 wherein the operation address means further comprises:
(d) (iii) an operation address list for receiving operation packet addresses, receptive to the indicia signal, for selecting an address when the indicia signal is received.

18. The sequencer of claim 17 wherein the operation address means further comprises:
(d) (ii) an operation address select connected to and receptive to selected addresses received from the operation address queue and connected to and receptive to addresses from the successor address means.

19. The sequencer of claim 15 wherein the successor address means further comprises:
(e) (i) a successor address portion queue, for receiving successor addresses from the memory means.

20. The sequencer of claim 17 wherein the successor address means further comprises:
(e) (ii) a successor address selector, connected to selectively receive successor addresses from the successor address portion queue, and connected to transmit the selected successor address selectively to either the operation address queue or the operation address selector.

21. The sequencer of claim 19 wherein the control means further comprises:
(f) (i) sequencing logic providing event-dependent sequential state signals for sequencing the procedures of the processor through sequential states; and
(ii) a gating logic array, having inputs including the state signals, for providing gating signals to the processor when appropriate state signals are present.

22. The sequencer of claim 21 wherein the memory means comprises a random access memory.

* * * * *